(12) United States Patent
Rogala et al.

(10) Patent No.: US 11,921,284 B2
(45) Date of Patent: Mar. 5, 2024

(54) OPTICAL ZOOM SYSTEM USING AN ADJUSTABLE REFLECTIVE FRESNEL LENS IMPLEMENTED WITH A MICRO-ELECTRO-MECHANICAL SYSTEM (MEMS) MICRO-MIRROR ARRAY (MMA)

(71) Applicant: Raytheon Company, Waltham, MA (US)

(72) Inventors: Eric Rogala, Tucson, AZ (US); Gerald P. Uyeno, Tucson, AZ (US); Sean D. Keller, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 424 days.

(21) Appl. No.: 17/207,177

(22) Filed: Mar. 19, 2021

(65) Prior Publication Data

US 2022/0299756 A1 Sep. 22, 2022

(51) Int. Cl.
*G02B 26/08* (2006.01)
*G02B 3/08* (2006.01)
(Continued)

(52) U.S. Cl.
CPC ........... *G02B 26/0841* (2013.01); *G02B 3/08* (2013.01); *G02B 7/182* (2013.01); *G02B 17/002* (2013.01)

(58) Field of Classification Search
CPC ...... G02B 26/0841; G02B 3/08; G02B 7/182; G02B 17/002; G02B 15/00; G02B 17/08; G02B 26/0833; G02B 23/12
See application file for complete search history.

(56) References Cited

U.S. PATENT DOCUMENTS

| 5,404,375 A | 4/1995 | Kroeger et al. |
| 5,854,702 A | 12/1998 | Ishikawa et al. |

(Continued)

FOREIGN PATENT DOCUMENTS

| DE | 102011104023.8 B4 | 7/2019 |
| EP | 2667142 A1 | 11/2013 |

(Continued)

OTHER PUBLICATIONS

"U.S. Appl. No. 16/871,602, Non Final Office Action dated Nov. 9, 2020", 18 pgs.

(Continued)

*Primary Examiner* — James C. Jones
(74) *Attorney, Agent, or Firm* — Schwegman Lundberg & Woessner, P.A.

(57) ABSTRACT

A zoom system includes a collection optic L1 and a reflective Fresnel Lens L2 having a variable focal length. The reflective Fresnel Lens L2 is implemented with a MEMS MMA in which the mirrors tip, tilt and piston form and alter the reflective Fresnel Lens to focus light at a common focal point to set the variable focal length f2, hence the magnification M. In different embodiments, the zoom system may be configured to be "focal" or "afocal". In the focal system, both L1 and L2 are fixed such that the system affects the net convergence or divergence of the magnified beam. In an afocal system, a mechanism is used to translate L2 to maintain a separation between L1 and L2 of d=f1+f2 as f2 is varied to change the magnification M.

20 Claims, 11 Drawing Sheets

(51) Int. Cl.
*G02B 7/182* (2021.01)
*G02B 17/00* (2006.01)

(56) References Cited

U.S. PATENT DOCUMENTS

| | | |
|---|---|---|
| 6,181,450 B1 | 1/2001 | Dishman et al. |
| 6,271,953 B1 | 8/2001 | Dishman et al. |
| 6,327,063 B1 | 12/2001 | Rockwell |
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegerling et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2012/0168605 A1* | 7/2012 | Milanovic ............ G01B 11/002 250/203.1 |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0066320 A1 | 2/2019 | Uyeno et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |

FOREIGN PATENT DOCUMENTS

| | | |
|---|---|---|
| EP | 2533003 B1 | 8/2018 |
| JP | 5606755 B2 | 10/2014 |
| WO | WO-2014200581 A2 | 12/2014 |

OTHER PUBLICATIONS

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"U.S. Appl. No. 17/007,917, Response filed Dec. 1, 2021 to Non Final Office Action dated Aug. 3, 2021", 16 pgs.

"High Contrast IR Wire Grid Polarizers", Edmund Optics, [Online]. Retrieved from the Internet: < URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, et al., "Demonstration of large-angle nonmechanical laser beam steering based on LC polymer polarization grating", Proc. of SPIE vol. 8052 80520T, (May 13, 2011), 13 pgs.

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 x 720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

U.S. Appl. No. 17/007,917, filed Aug. 31, 2020, Electronically Steered Inter-Satellite Optical Communication System With Micro-Electromechanical (MEM) Micromirror Array (MMA).

"U.S. Appl. No. 17/007,917, Notice of Allowance dated Jan. 10, 2022", 14 pgs.

(56) References Cited

OTHER PUBLICATIONS

"U.S. Appl. No. 17/007,917, Supplemental Notice of Allowability dated Apr. 19, 2022", 2 pgs.
"MEMS Mirror Array—Beam Steering Mode", [Online]. Retrieved from the Internet: <www.youtube.com/watch?v=wHIUU3kKtzM>, (Aug. 10, 2017), 2 pgs.
Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.
Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.
Tsou, et al., "Extended-image spatial tracking technique for deep-space optical downlinks", Proc. SPIE 3762, Adaptive Optics Systems and Technology, (Sep. 27, 1999), 101-109.
Tuantranont, et al., "Optical beam steering using MEMS-controllable microlens array", Sensors and Actuators A: Physical vol. 91, Issue 3, (Jul. 15, 2001), 363-372.

\* cited by examiner

OPTICAL ZOOM SYSTEM USING AN ADJUSTABLE REFLECTIVE FRESNEL LENS IMPLEMENTED WITH A MICRO-ELECTRO-MECHANICAL SYSTEM (MEMS) MICRO-MIRROR ARRAY (MMA)

BACKGROUND OF THE INVENTION

Field of the Invention

This invention relates to optical zoom systems that provide for variable magnification of an optical beam and more particularly to optical zoom systems, both afocal and focal, that use a reflective Fresnel lens implemented with a MEMS MMA to adjust the focal length of the lens, hence the magnification of the system.

Description of the Related Art

An optical magnification system can be created with a pair of optical elements L1 and L2 where each optical element may itself comprise one or more elements. The zoom system alters the width of the beam, increasing magnification by M=f(f1, f2) where f1 and f2 are the respective focal lens of optical elements L1 and L2. Without further constraint, the "focal" system will produce a net convergence or divergence of the magnified beam. In an "afocal" system L1 and L2 are spaced by a distance d=f1+f2 such that the system does not alter the convergence or divergence of the magnified beam and the magnification M=f2/f1. In either case, the magnification M is fixed.

As shown in FIG. 1, an afocal zoom system 10, in which the magnification M can be varied over a certain ratio, consists of two positive (converging) lenses of equal focal length (L1 and L3) with a negative (diverging) lens (L2) between them with an absolute focal length less than half of the positive lenses. L3 is fixed but L1 and L2 can move axially in a non-linear relationship. This movement is usually performed by a complex arrangement of gears and cams in the lens housing, although some modern zoom lenses use computer-controlled servos to perform this positioning.

While the negative lens $L_2$ moves from the front to the back of the lens, the lens $L_1$ moves forward and then backward in a parabolic arc. In doing so, the overall angular magnification of the system varies, changing the effective focal length of the complete zoom lens. At each of the three points shown, the three-lens system is afocal (neither diverging or converging the light), and hence does not alter the position of the focal plane of the lens. Between these points, the system is not exactly afocal, but the variation in focal plane position can be small enough (about ±0.01 mm in a well-designed lens) not to make a significant change to the sharpness of the image. Placement of a focusing lens L4 at the output of afocal zoom system 10 produces an image at a fixed imaging plane.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a zoom system including a collection optic L1 and a reflective Fresnel Lens L2 having a variable focal length. The reflective Fresnel Lens L2 is implemented with a MEMS MMA in which the mirrors tip, tilt and piston form and alter the reflective Fresnel Lens to focus light at a common focal point to set the variable focal length L2, hence the magnification M. This configuration may support a specified magnification ratio between f2 min and f2 max.

In different embodiments, the zoom system may be configured to be "focal" or "afocal". In the focal system, both L1 and L2 are positionally fixed such that the system produces a net convergence or divergence of the magnified beam. A positionally fixed variable focus mirror L3 may be implemented from a second MEMS MMA configured to offset the net convergence or divergence and form an image at a fixed image plane. Alternately, a fixed focus mirror L3 may be translated to form the image at the fixed image plane. In an afocal system, a mechanism is used to translate L2 to maintain a separation between L1 and L2 of d=f1+f2 as f2 is varied to change the magnification M and produce no net convergence or divergence. A conventional focus optic may be positioned to form an image at a fixed image plane.

In an embodiment, the center region and each of the concentric rings include one or more mirrors in the cross-section or width of the region or ring. The number of mirrors is determined by the specified magnification M, a base curvature for L2 to provide the requisite f2 and the sampling process, uniform or non-uniform, used to define the structure of the concentric rings. The base curvature may be sampled by, for example, computing the modulus 2 pi of the thickness of the base curvature as done for a refractive Fresnel lens to define the ring structure. The one or more mirrors are tipped, tilted and pistoned to form a reflective surface that approximates the corresponding section of the base curvature adjusted for an offset in the position of the ring known as the "sag".

In different embodiments, the MEMS MMA may be configured to steer a FOV in which to collect the beam of light, to partition itself to form a plurality of reflective Fresnel lenses to collect and magnify different beams of light, to reflect light at different wavelengths to provide the magnified beam of light with a diversity of spectral components, to superimpose an additional beam shaping (via piston action) onto the magnified beam or any combination thereof. The additional beam shaping may address producing deviations in a wavefront of the magnified beam to compensate for atmospheric distortion or path length differences across the wavefront.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
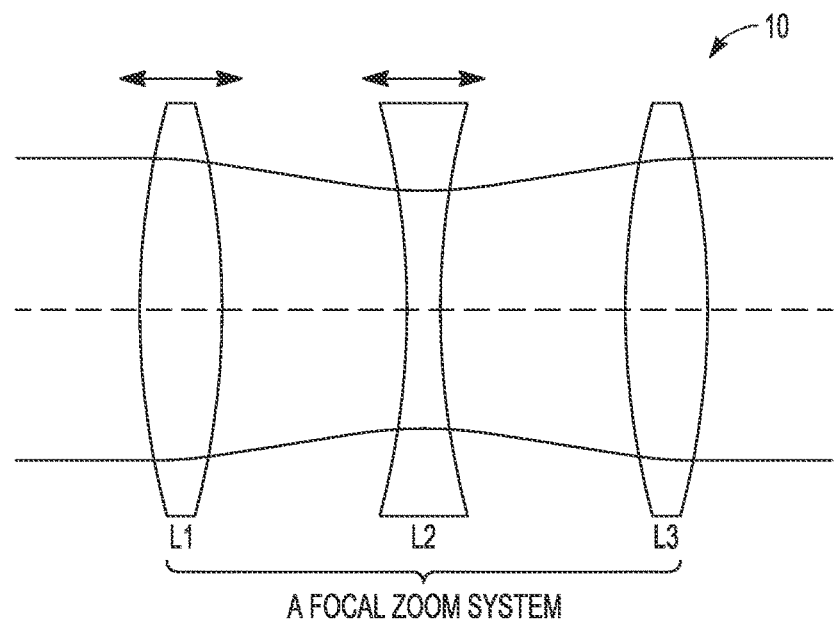
FIG. 1, as described above, is diagram of a conventional Afocal zoom system.

The present invention provides a zoom system that includes a collection optic L1 having a focal length f1 and a reflective Fresnel Lens L2 having a variable focal length f2. The reflective Fresnel Lens L2 is implemented with a MEMS MMA in which the mirrors tip, tilt and piston form and alter the reflective Fresnel Lens to focus light at a common focal point to set the variable focal length f2, hence the magnification M=f(f1, f2). In different embodiments, the zoom system may be configured to be "focal" or "afocal". In the focal system, both L1 and L2 are fixed such that the system affects the net convergence or divergence of the magnified beam. In an afocal system, a mechanism is used to translate L2 to maintain a separation between L1 and L2 of d=f1+f2 is varied to change the magnification M=f2f1 with no net effect on the convergence or divergence. L1 and L2 are commonly referred to as the "primary" and "secondary" optics of the zoom system. The primary and secondary optics may be configured to implement any number of configurations including but not limited to on-axis telescopes such as the Cassegrain, Mersenne, Gregorian or Newtonian or an off-axis telescope such as a Herschelian. The invention may be implemented in any of these or other telescope configurations that utilize both primary and secondary optics L1 and L2. For clarity, the invention will now be described in the context of a Cassegrain telescope.

Referring now to FIGS. 2A-2B, 3A-3B and 4A-4B, an embodiment of an afocal zoom system 100 includes a primary mirror L1 102 having a fixed focal length f1 and a secondary mirror L2 104 having a variable focal length f2. L1 and L2 are configured to collect a beam of light illustrated by a marginal ray 105 that indicates where an image is located in image space and a chief ray 106 that indicates the angle to the image. A mechanism 108 e.g. a translation stage translates L2 to maintain a spacing d=f1+f2 between L1 and L2 such that L2 alters the width of the beam by a magnification M=f1/f1 with no affect on the net convergence or divergence of the beam. A controller 110 is responsive to a zoom command to access commands stored in a LUT 112 to provide commands to L2 and mechanism 108 to vary focal length f2 and translate L2 to maintain spacing d. In other embodiments, controller 110 could compute these commands in response to a zoom command but it is more efficient to pre-compute and store the commands in LUT 112.

Figure 2A:
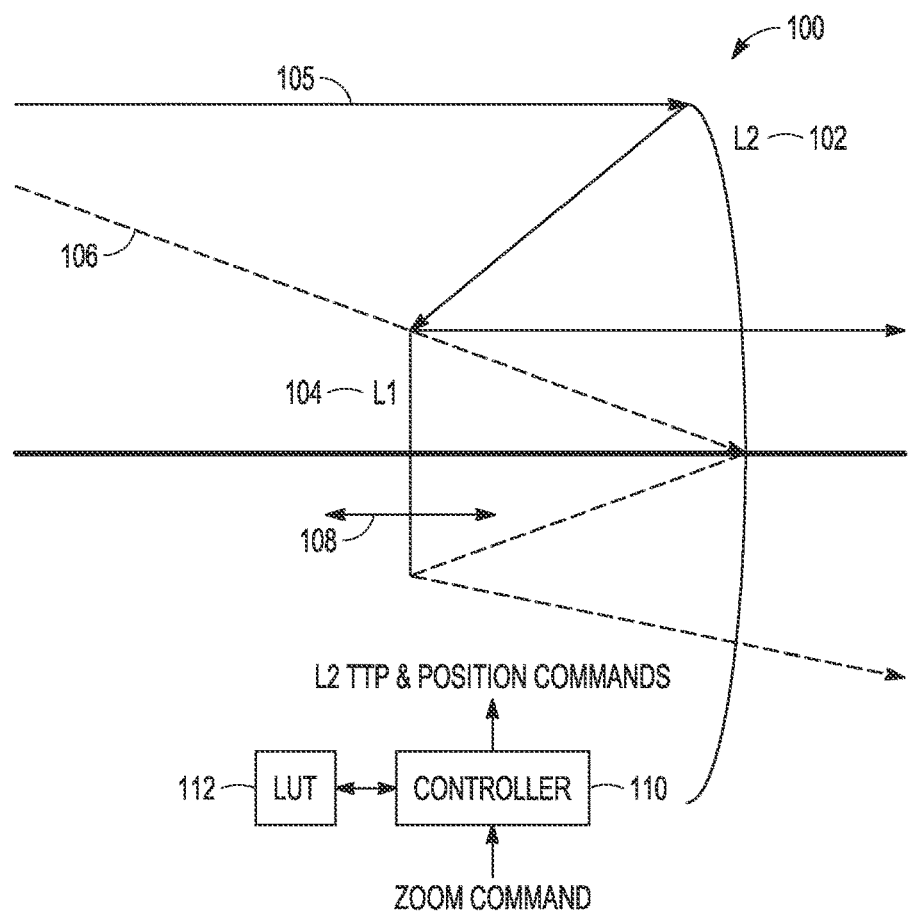
FIGS. 2A and 2B are diagrams of an embodiment of an on-axis afocal zoom system in which a MEMS MMA is used to implement a reflective Fresnel lens to adjust the focal ratio of the system.
Figure 2B:
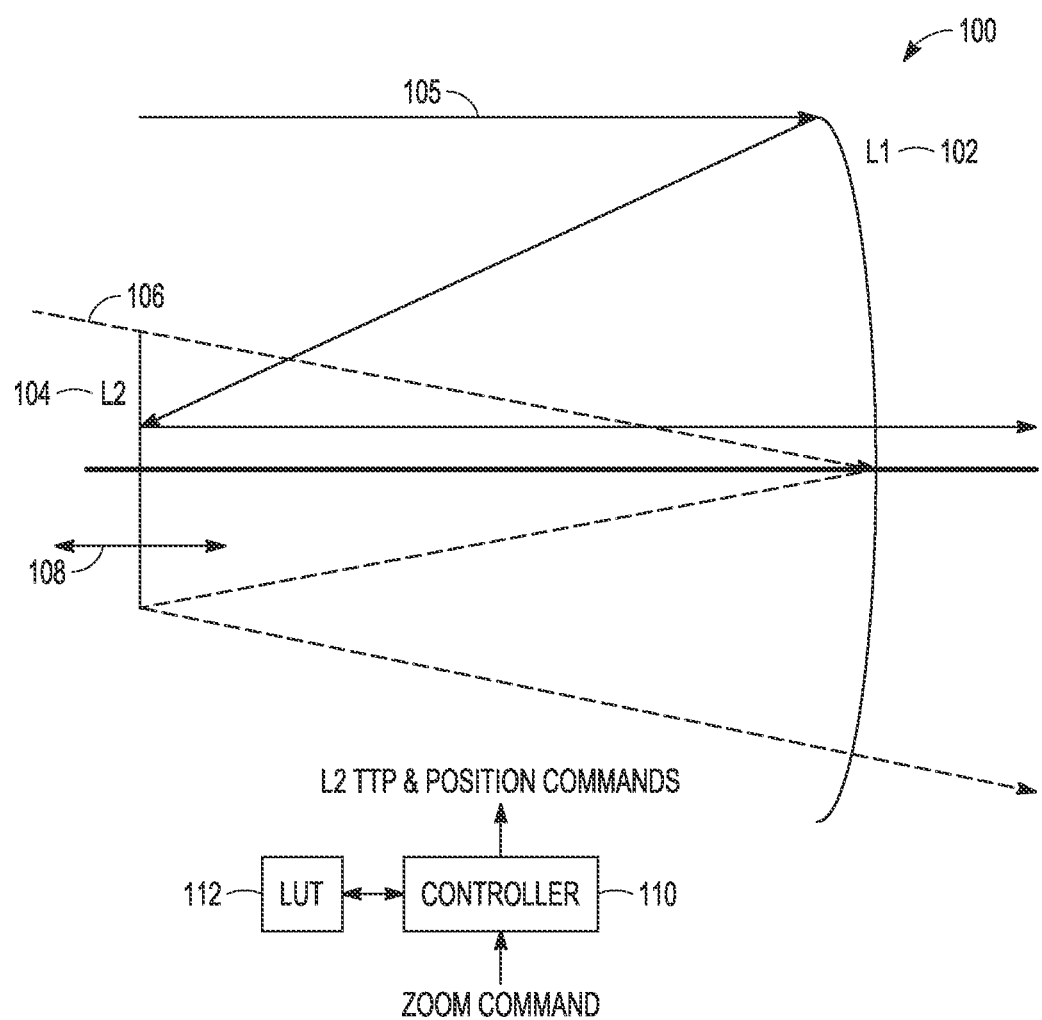
Figure 3A:
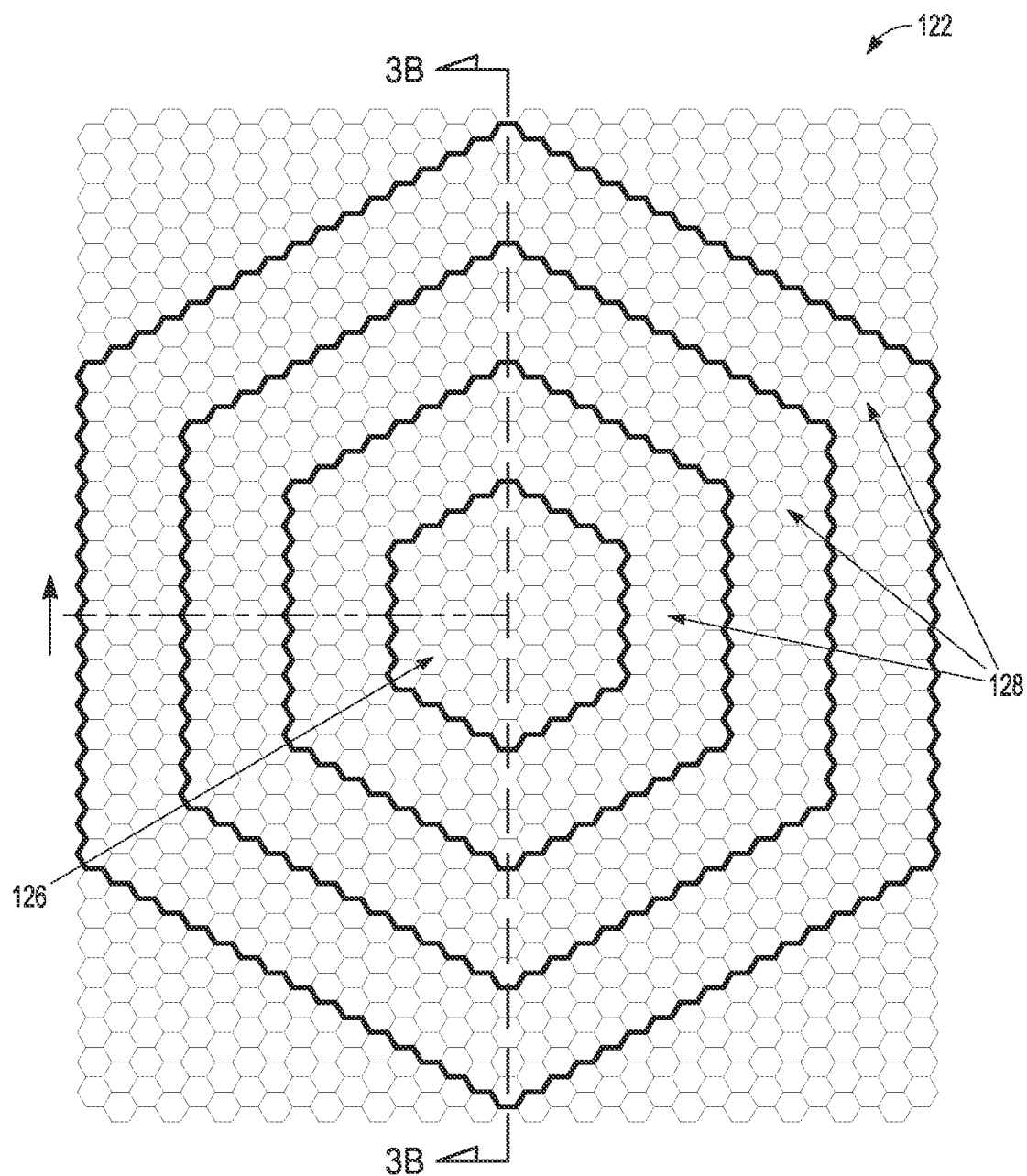
FIGS. 3A and 3B are front and section views of a MEMS MMA configured to implement a reflective Fresnel lens in which the mirrors are tipped, tilted and pistoned to adjust the focal length of the lens.
Figure 3B:
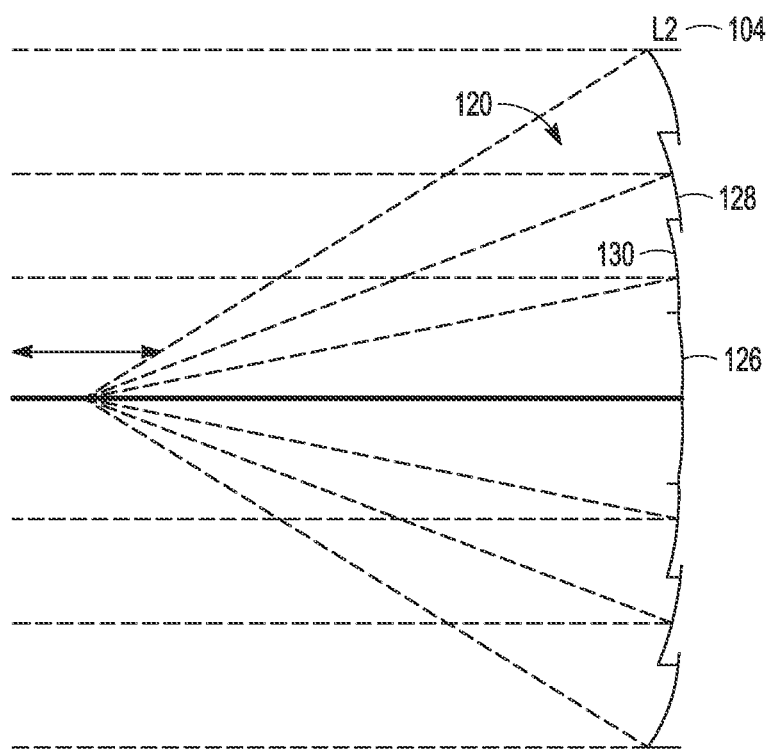

As shown in FIG. 2A, L2 is configured with a minimum focal length f2 min and translated to the minimum spacing between L1 and L2. This corresponds to the maximum field-of-view (FOV) and minimum magnification of the collected beam. As shown in FIG. 2B, L2 is configured with a maximum focal length f2 max and translated to the maximum spacing between L1 and L2. This corresponds to the minimum FOV and maximum magnification of the collected beam. The minimum and maximum focal lengths f2 will define a ratio for magnification M supported by a particular zoom system.

As shown in FIGS. 3A-3B and 4A-4B, secondary mirror L2 104 is implemented as a reflective Fresnel Lens 120 having variable focal length f2. A conventional refractive Fresnel Lens is a flattened version of a convex lens. It was developed in the early 19$^{th}$ century as a way to reduce the amount of glass material needed to build a convex lens (specifically for large lighthouse lenses). A Fresnel Lens uses the cross-sections of the curvature of a convex lens but flattens them onto a planar surface. The surface of a Fresnel Lens contains a series of concentric rings—each ring having a slightly different cross-section curvature corresponding to the curvature of a convex lens of equal diameter. A reflective Fresnel Lens may be implemented using concentric rings of mirror prisms formed with the respective cross-section curvatures or flat surfaces that approximate those curvatures, which is easier to manufacture.

To provide a variable focal length capability, the reflective Fresnel Lens 120 comprises a Micro-Electro-Mechanical System (MEMS) Micro-Mirror Array (MMA) 122 including a plurality of independently and continuously controllable mirrors 124. Each mirror is capable of at least "Tip" (rotation about an X-axis), "Tilt" (rotation about a Y-axis and "Piston" (translation along a Z-axis, perpendicular to the XY plane) where the X, Y and Z are orthogonal axes in a three-dimensional space. The MEMS MMA is responsive to the command signals to tip, tilt and piston the mirrors 124 in three degree-of-freedom (DOI) to form a center region 126 (or inner ring) surrounded by a plurality of concentric rings 128 whose reflective surfaces 130 as formed by the mirrors approximate respective curvatures to focus light at a common focal point 132 to set the second variable focal length f2 and magnification M.

More specifically, center region 126 and each of the concentric rings 128 may include one or more mirrors across the section of the region or ring that tipped, tilted and pistoned to approximate a continuous surface having a specified curvature. The number of mirrors across the section may be uniform or non-uniform for the plurality of rings. The Piston capability can be used to provide the requisite translation of mirrors within a section to approximate a continuous surface at a specified curvature (combined tip and tilt angles of the one or more mirrors). The maximum amount of translation "z" of the mirror to Piston limits the maximum curvature that can be serviced for a given grouping of mirrors in a section. The greater the number of mirrors, the smaller the maximum curvature. More specifically, the maximum angle of curvature is given by arcsin(z/w) where w is the width of the section e.g. number of mirrors in a given direction multiplied by the width of the mirror. Therefore, for small angles, the MEMS MMA can be partitioned into a small number of sections thereby limiting the number of edge discontinuities, hence the amount of diffraction.

The piston capability can also be used to perform other beam shaping functions such as to adjust the size, divergence or intensity profile of the beam, produce deviations in the wavefront of the beam to compensate for atmospheric distortions or path length differences, add optical power to the beam or to improve the formation and steering of the beam by approximating a continuous surface across the micro-mirrors, which reduces unwanted diffraction to increase power in the f optical beam.

The MEMS MMA is preferably capable of tipping and tilting over range of at least −15°×+15° to steer over a range of +/−30°×30° and pistoning (translating) over a range of at least +/−15 microns (at least one-half wavelength in either direction) piston at a rate of at least 1 KHz (<1 millisecond). The independently controllable mirrors can be adaptively segmented to form any number of beams, adjust the size/power of a given beam, generate multi-spectral optical beams and to combine multiple input sources. Further, the MEMS MIMA must have a sufficient number of mirrors, mirror size/resolution, fill factor, range of motion, response time, response accuracy and uniformity across the array.

Figure 4A:
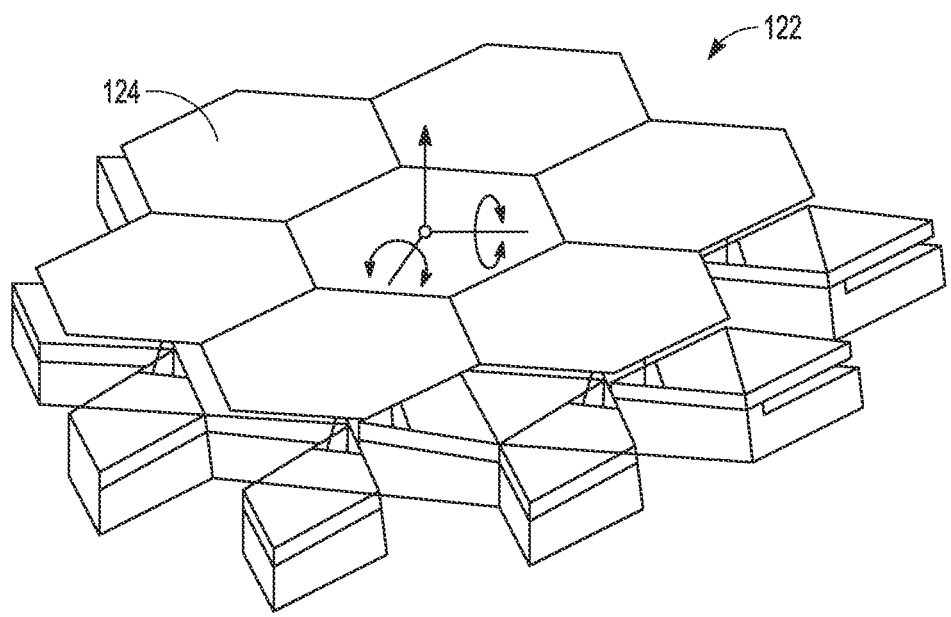
FIGS. 4A and 4B are illustrations of a known embodiment of a Tip/Tilt/Piston ("TTP") MEMS MMA and a single mirror actuated to tip, tilt and piston.
Figure 4B:
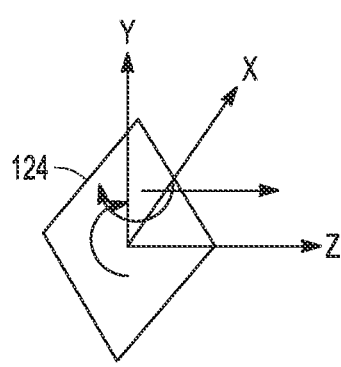

One such MEMS MMA as illustrated in FIGS. 4A-4B is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MIMA uses flexures to support each mirror at three fulcrum points (or vertices) of an equilateral triangle. The three different pairs of fulcrum points define three axes at 60 degrees to one another in the YY plane. Each mirror pivots about each axis to produce tip, tilt and piston in the XYZ space. This MEMS MMA is currently being commercialized by Bright Silicon technologies for "digitally controlling light."

Figure 5A:
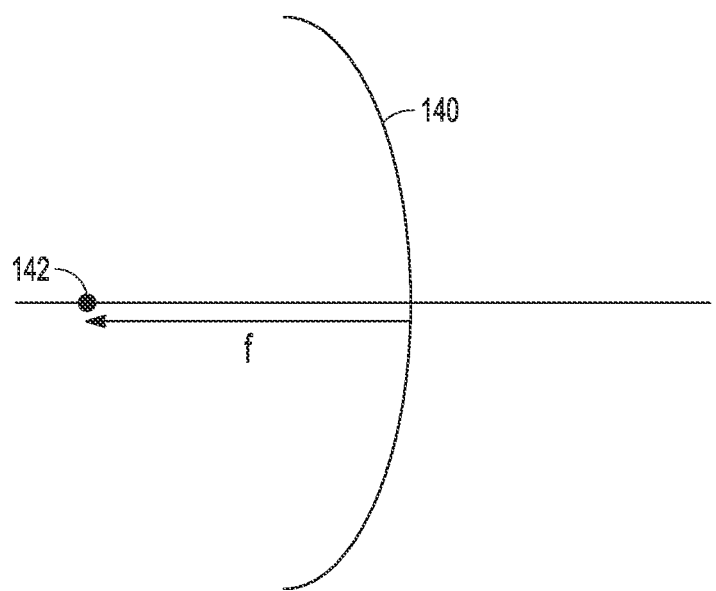
FIGS. 5A through 5C illustrate an equivalent mirror and uniform and non-uniform sampling of a base curvature of an equivalent mirror.
Figure 5B:
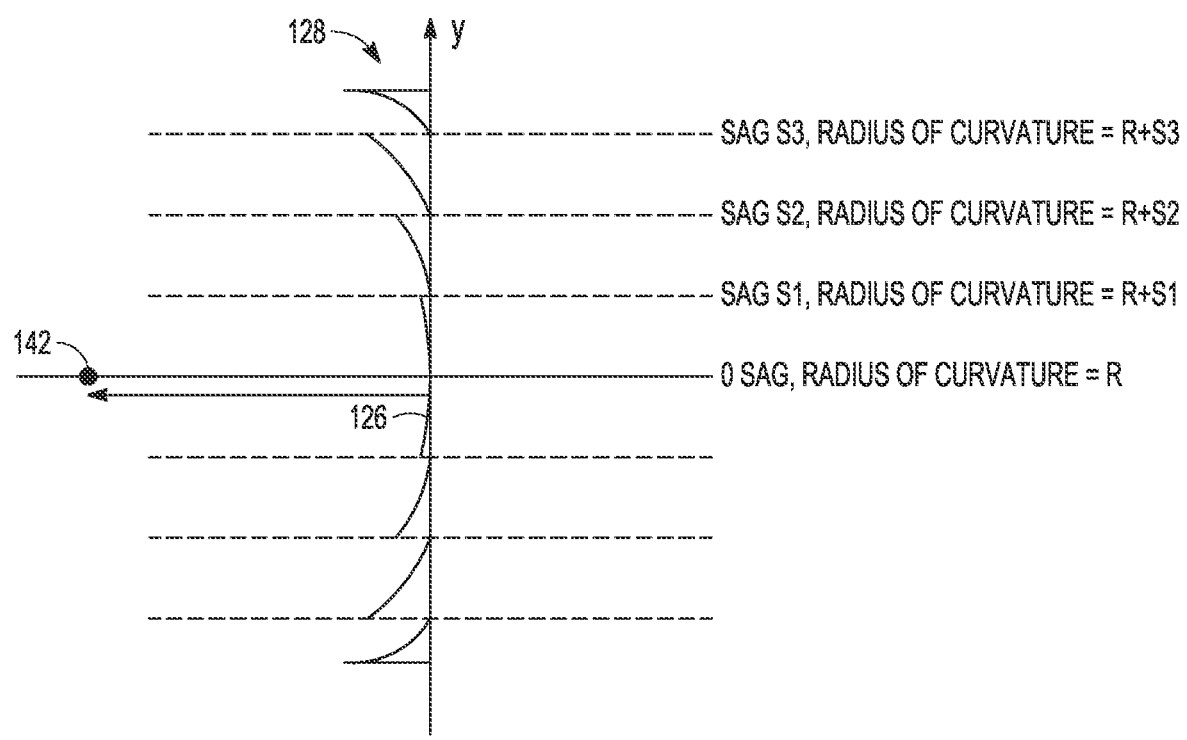
Figure 5C:
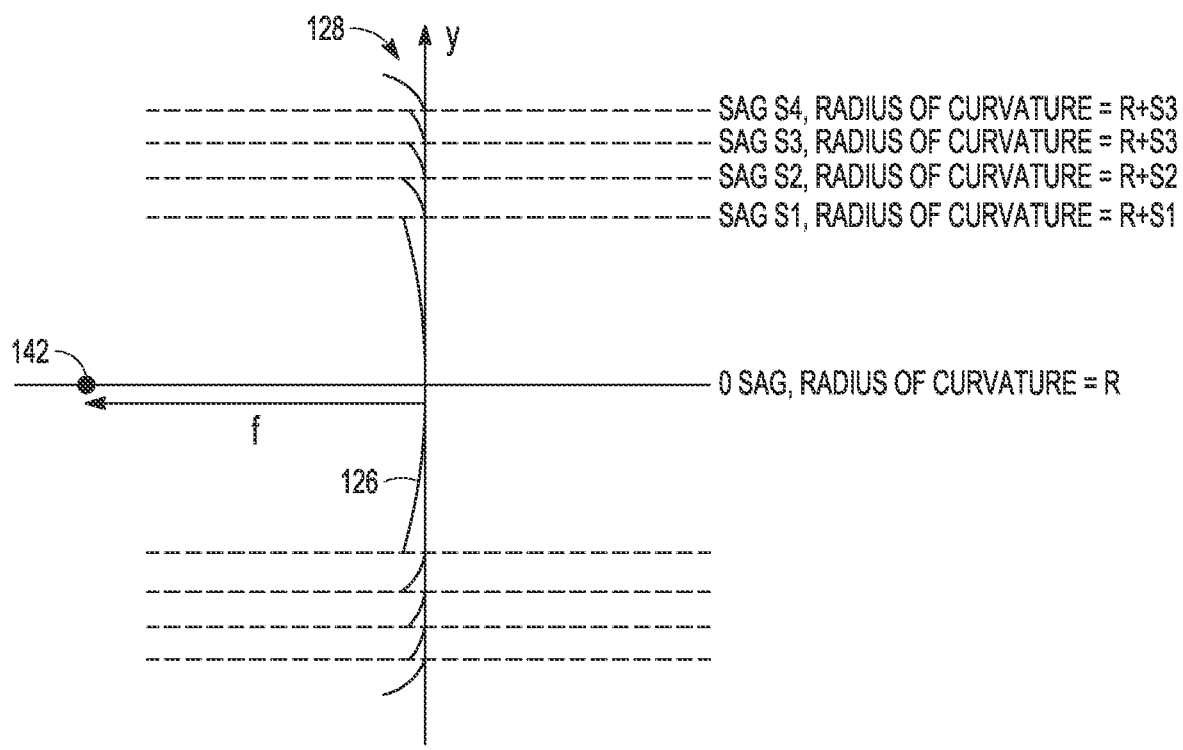

Referring now to FIGS. 5A-5C, the center region 126 and concentric rings 128 of the reflective Fresnel Lens may be configured using either a uniform or non-uniform sampling of an equivalent mirror 140. The equivalent mirror 140 may be concave or convex and any simple or compound curvature provided it performs the necessary function of the secondary optic L2. For simplicity of illustration, we will assume a simple concave mirror have a radius of curvature R=2f and a common focal point 142.

A reflective Fresnel Lens may be considered as a cross-section of a series of mirrors whose radius of curvature is such that the focal points coincide at the common focal point 142. The starting point is the curvature of the equivalent lens at the position corresponding to each concentric ring. In general this may vary but in the illustrated example that curvature is just the radius of curvature R of equivalent mirror 140. The radius of curvature for each concentric ring must be adjusted for "sag" defined as the departure of the reflective surface of the concentric from the vertex plane. In lay terms, sag is the offset from the surface of the equivalent mirror to surface of the Fresnel Lens. The radius of curvature for a particular ring is thus the radius of curvature of the equivalent lens and the sag for the particular ring (e.g., S1, S2, S3). Each ring focuses the reflected light to the common focal point 142. Note, it is preferable that the true curvature is maintained. However, in some implementations or portions thereof the curvature may be approximated by a flat tipped/tilted surface.

As shown in FIG. 5B, equivalent mirror 140 is uniformly sampled in the y direction (and x direction). The center region 126 and each ring 128 have the same width, same number of mirrors, in cross-section. For the simple concave mirror, the sag increases as the rings get progressively further from the center region. As such, the radius of curvature is larger. The outer zings will require more piston (translation) of the mirrors to form the reflective surfaces that approximate the radius of curvature.

As shown in FIG. 5C, equivalent mirror 140 is non-uniformly sampled in the y direction (and x direction), The center region 126 and each ring 128 have different widths, different number of mirrors, in cross-section. Non-uniform sampling may be done for various reasons including but not limited to reducing the piston requirements on the outer rings. For the simple concave mirror, the sag is more uniform across the rings.

As previously mentioned, the zoom system may also be implemented as a "focal" system in which both L1 and L2 are fixed. The advantage being that L2 does not have to be moved to maintain a certain spacing as focal length f2 is varied. However, this system affects the net convergence of divergence of the magnified beam. In many applications this beam must be formed into an image at an image plane where an imaging detector is positioned. One option is to translate a focusing lens and/or the imaging detector to track the movement of the imaging plane as focal length f2 is varied. This is a viable alternative but simply trades off the benefit of having a positionally fixed L2 against requiring a mechanism to translate the focusing lens and/or the imaging detector.

Figure 6A:
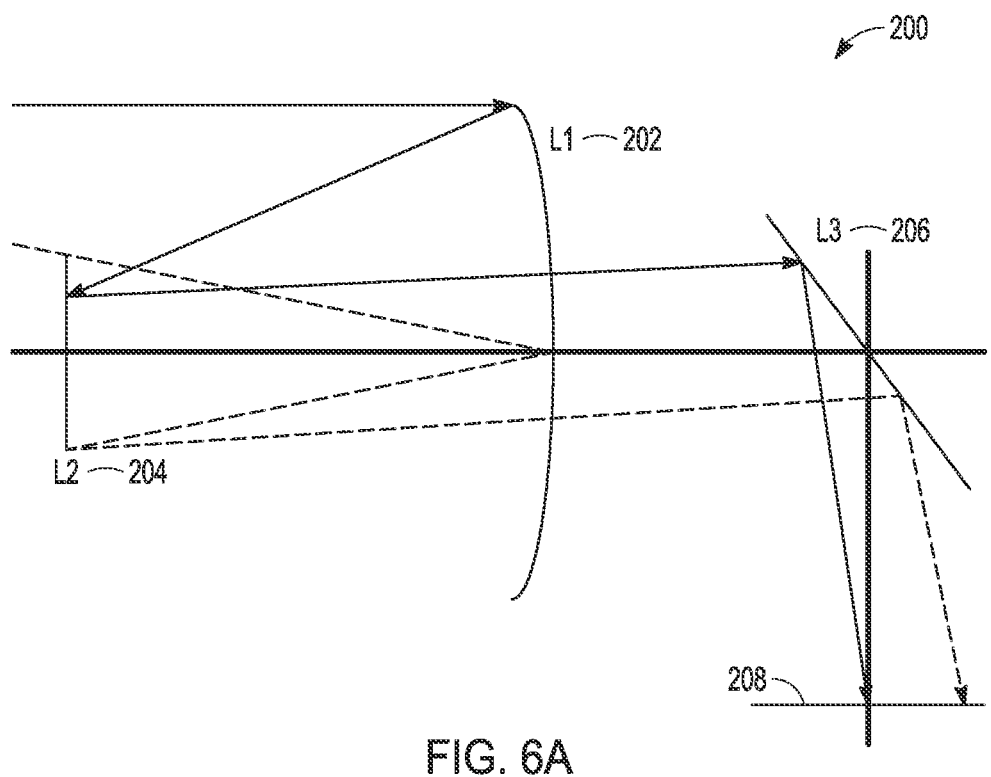
FIGS. 6A and 6B are diagrams of an embodiment of an on-axis focal zoom system in which a first MEMS MMA is configured to implement a reflective Fresnel lens to adjust the focal ratio of the system and a second MEMS MMA is configured to offset the net convergence/divergence and form an image at a positionally fixed image plane.
Figure 6B:
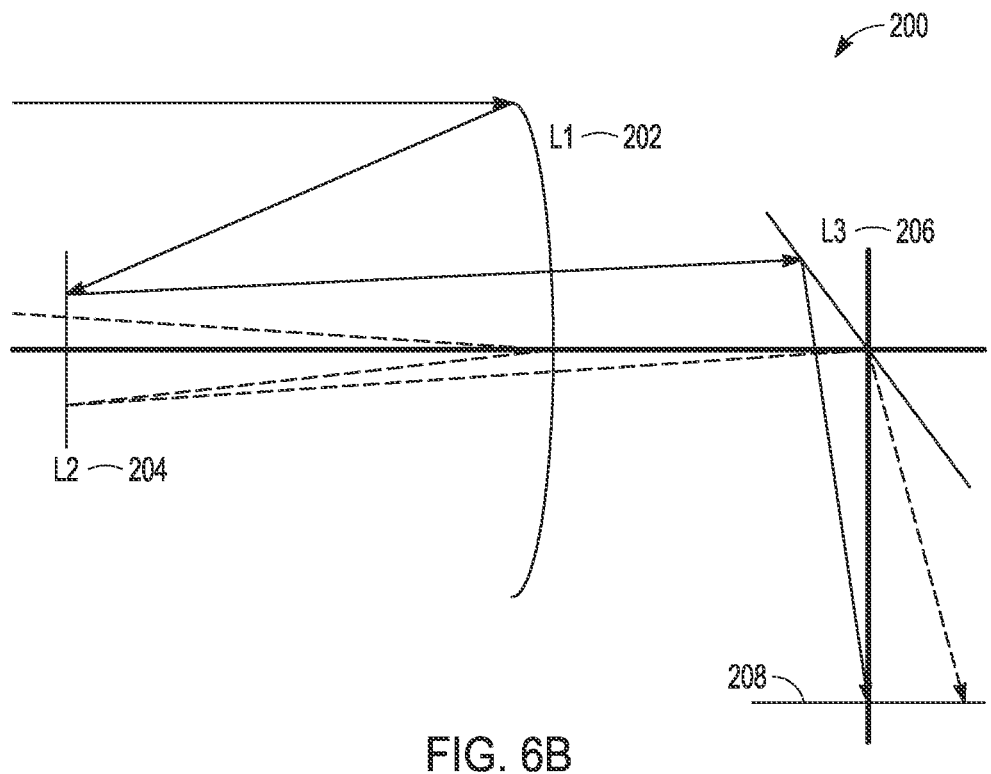

Referring now to FIGS. 6A-6B, an embodiment of a zoom system 200 includes a primary mirror L1 202 having a fixed focal length f1, a secondary mirror L2 202 including a MEMS MMA configured to implement a reflective Fresnel Lens with a variable focal length f2 and a focusing mirror L3 204 including another MFMS MMA configured to offset and cancel the net convergence or divergence and form an image at an image plane 206. Each of L1, L2, L3 and the image plane are positionally fixed. No translation mechanisms are required to achieve a variable magnification within an imaging system.

As the magnification M increases from FIG. 6A to 6B, thereby changing the net convergence or divergence, the focusing mirror L3 (as implemented by the MEMS MMA) changes its focus length f3 to cancel the net convergence or divergence and form the image at the same image plane 206. Focusing mirror L3 may be formed as either an equivalent mirror (convex or concave) or as a Fresnel Lens depending on the dynamic range required to offset the changes in net convergence or divergence and form the image at the image plane.

Figure 7:
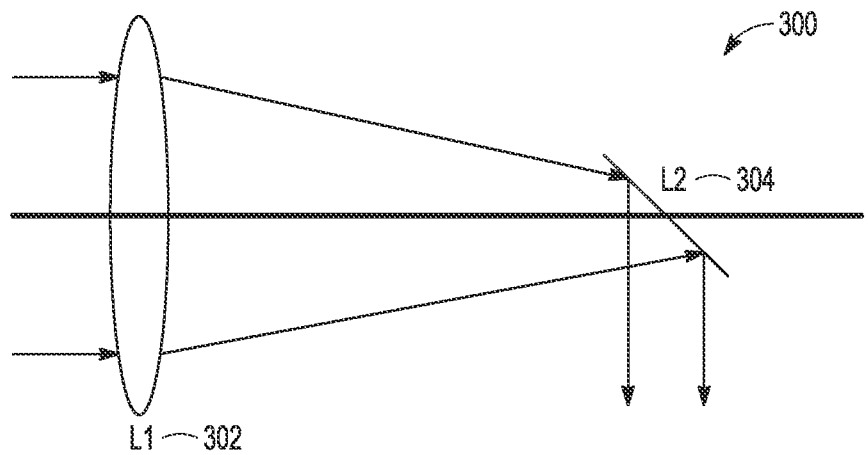
FIG. 7 is a diagram of an on-axis afocal zoom system in which L1 is a transmissive lens.

Referring now to FIG. 7, an embodiment of a zoom system 300 includes a primary lens L1 302 having a focal length f1 and a secondary mirror L2 304 including a MEMS MMA configured to implement a reflective Fresnel Lens with a variable focal length f2.

Figure 8:
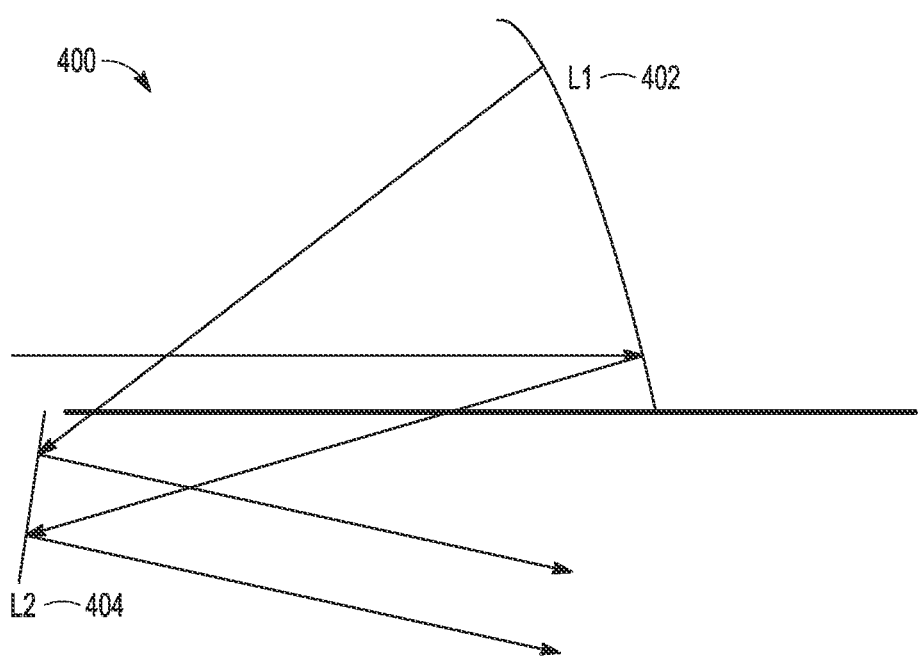
FIG. 8 is a diagram of an off-axis afocal zoom system.

Referring now to FIG. 8, an embodiment of an off axis system 400 includes a primary mirror L1 402 that represents a portion of an equivalent mirror and a secondary mirror L2 404 including a MEMS MMA configured to implement a reflective Fresnel Lens with a variable focal length f2. An off-axis configuration is more complicated by avoids obscuration of the FOV by L2.

As previously mentioned, the MEMS MMA that implements the reflective Fresnel Lens may be configured to perform additional optical functions besides varying the focal length f2 to perform the zoom function. These additional optical functions will require a certain amount of the dynamic range in tip, tilt and piston that is available. The system would have to allocation dynamic range between the zoom and other optical functions.

Figure 9:
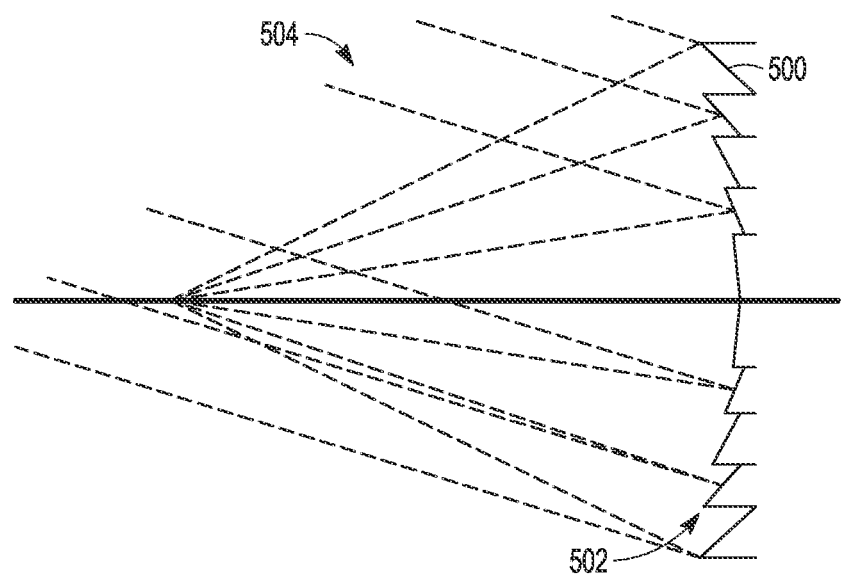
FIG. 9 is a diagram of an embodiment in which the MEMS MMA is configured to tilt the Fresnel lens to steer the optical beam.

Referring now to FIG. 9, a MEMS MMA 500 is responsive to command signals to form a reflective Fresnel Lens 502 with a variable focal length to adjust the magnification of a beam light and to command signals (superimposed on the underlying Fresnel Lens command signals) to steer the input FOV 504. The command signals for steering the FOV may be pre-computed and stored in the LUT.

Figure 10:
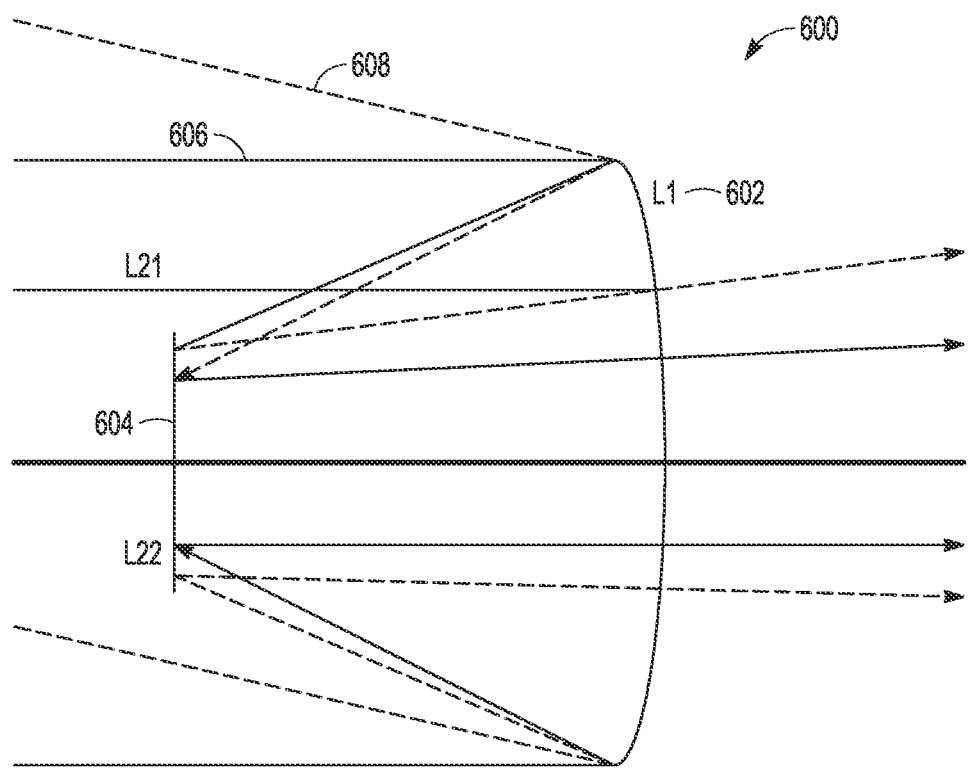
FIG. 10 is a diagram of an on-axis optical zoom system in which the MEMS MMA is partitioned to form multiple reflective Fresnel lenses to form and magnify a plurality of beams.

Referring now to FIG. 10, a zoom system 600 includes a primary mirror L1 602 and a MEMS MMA 604 is responsive to command signals to partition the MEMS MMA into a plurality of segments each comprising a plurality of mirrors. Each segment is responsive to command signals to form a different reflective Fresnel lens L2 with a variable focus length to collect and magnify a different beam of light. As illustrated, MEMS MMA 600 is partitioned to form a pair of reflective Fresnel Lenses L21 and L22 with focal lengths f21 and f22, respectively. The different beams 606 and 608 may be scanned over the same or different FOV, same or different magnification and the same or different spectral compositions or any combination thereof. In the case of different magnifications, L2 would be suitably fixed and another MFMS MMA would be used (and similarly partitioned) to process the magnified beams to form the images at the fixed image plane.

Figure 11:
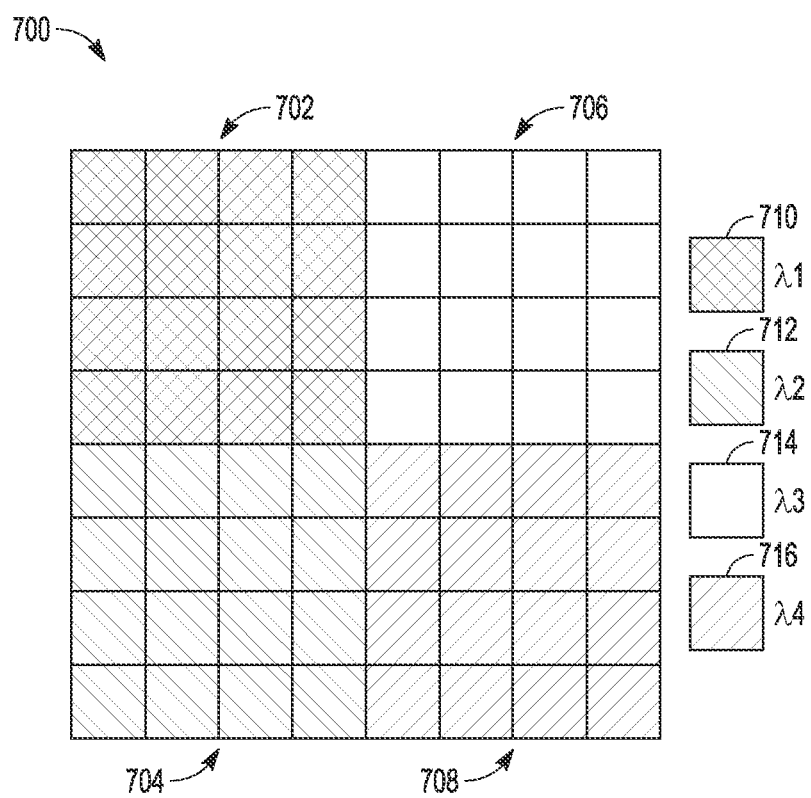
FIG. 11 is a diagram of an embodiment in which the MEMS MMA is partitioned into a plurality of segments having different optical coatings to implement a spectrally diverse optical zoom system.

Referring now to FIG. 11, a MFMS MMA 700 that is configured to implement the reflective Fresnel Lens L2 may include mirrors configured to reflect light at different wavelengths such that the magnified beam includes a plurality of different wavelengths. In this particular embodiment, the MMA is partitioned into four segments 702, 704, 706 and 708 each including a plurality of mirrors provided with reflective coatings 710, 712, 714 and 716 at different wavelengths. The MMA may be configured as a single reflective Fresnel Lens that magnifies a beam including all four wavelengths. Alternately, the MMA could be configured as four reflective Fresnel Lens each having a different wavelength. In an alternate embodiment, the different wavelengths could be interspersed with each other. Partitioning the MMA into multiple reflective Fresnel Lenses could provide each such lens with spectral diversity.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A zoom system, comprising:
a collection optic having a first focal length f1, said collection optic configured to collect a beam of light; and
a reflective Fresnel Lens having a second variable focal length f2 configured to alter a width of the beam of light,
said reflective Fresnel Lens comprising a Micro-Electro-Mechanical System (MEMS) Micro-Mirror Array (MMA) including a plurality of mirrors, said MFMS MMA responsive to command signals to tip, tilt and piston the mirrors in three degree-of-freedom (DOF) to form a center region surrounded by a plurality of concentric rings whose reflective surfaces as formed by the mirrors approximate respective curvatures to focus light at a common focal point to set the second variable focal length f2.

2. The zoom system of claim 1, wherein the MEMS MMA is configured to vary the magnification M over a specified ratio.

3. The zoom system of claim 1, further comprising:
a mechanism responsive to position signals configured to translate the reflective Fresnel lens to maintain a spacing d between the collection optic and the reflective Fresnel lens of d=f1+f2 to provide an afocal system that alters the width of the beam of light by a magnification M=f2/f1.

4. The zoom system of claim 1, wherein the MEMS MMA wherein the collection optic and the reflective Fresnel lens are positionally fixed thereby producing a net convergence or divergence of the altered beam, further comprising a positionally fixed focusing mirror having a third variable focus length f3, said focus mirror comprising a MEMS MMA including a plurality of mirrors responsive to command signals to tip, tilt and piston the mirrors in three degree-of-freedom (DOE) to set the third variable focal length f3 to offset the net convergence or divergence and form an image at a positionally fixed image plane.

5. The zoom system of claim 1, wherein the MFMS MIMA is configured such that at least one of the concentric rings includes a plurality of mirrors tipped, tilted and pistoned to approximate a continuous surface of the respective curvatures.

6. The zoom system of claim 5, wherein the mirrors configured to form the reflective surfaces of the center region and the plurality of concentric rings represent a uniform sampling of a base curvature whose focal point is at the common focus.

7. The zoom system of claim 5, wherein the mirrors configured to form the reflective surfaces of the center region and the plurality of concentric rings represent a non-uniform sampling of a base curvature whose focal point is at the common focus.

8. The zoom system of claim 1, wherein the MEMS MMA is responsive to command signals to tip, tilt and piston the mirrors to steer a field-of-view (FOV) in which to collect the beam of light.

9. The zoom system of claim 1, wherein the MEMS MIMA is responsive to command signals to partition the MEMS MMA into a plurality of segments each comprising a plurality of mirrors, each segment responsive to command signals to form a different adjustable reflective Fresnel lens to collect and magnify a different beam of light.

10. The zoom system of claim 1, wherein the mirrors are configured to reflect light at different wavelengths such that the magnified beam includes a plurality of different wavelengths.

11. The zoom system of claim 1, wherein the MFMS MMA is responsive to additional command signals to piston the mirrors to superimpose an additional beam shaping onto the magnified beam.

12. The zoom system of claim 11, wherein the additional command signals produce deviations in a wavefront of the magnified beam to compensate for atmospheric distortion or path length differences across the wavefront.

13. An afocal zoom system, comprising:
a collection optic having a first focal length f1, said collection optic configured to collect a beam of light;
a reflective Fresnel Lens having a second variable focal length f2 configured to alter a width of the beam of light by a magnification M=f2/f1; and a mechanism responsive to position signals configured to translate the reflective Fresnel lens to maintain a spacing d between the collection optic and the reflective Fresnel lens of d=f1+f2 said reflective Fresnel Lens comprising a Micro-Electro-Mechanical System (MEMS) Micro-Mirror Array (MMA) including a plurality of mirrors, said MEMS MMA responsive to command signals to tip, tilt and piston the mirrors in three degree-of-freedom (DOF) to form a center region surrounded by a plurality of concentric rings whose reflective surfaces as formed by the mirrors approximate respective curvatures to focus light at a common focal point to set the second variable focal length f2 and magnification M.

14. The zoom system of claim 13, wherein the MEMS MMA is configured such that the center region and at least one of the concentric rings include a plurality of mirrors tipped, tilted and pistoned to approximate a continuous surface of the respective curvatures.

15. The zoom system of claim 13, wherein the MEMS MMA is responsive to command signals to partition the MEMS MMA into a plurality of segments each comprising a plurality of mirrors, each segment responsive to command signals to form a different adjustable reflective Fresnel lens to collect and magnify a different beam of light.

16. The zoom system of claim 13, wherein the MEMS MMA is responsive to additional command signals to piston the mirrors to superimpose an additional beam shaping onto the magnified beam.

17. A reflective Fresnel Lens having an adjustable focal length f1, comprising:
a controller configured to generate command signals to configure a reflective Fresnel lens with a particular focal length f1; and
a Micro-Electro-Mechanical System (MEMS) Micro-Mirror Array (MMA) including a plurality of mirrors, said MEMS MMA responsive to said command signals to tip, tilt and piston the mirrors in three degree-of-freedom (DOF) to form a center region surrounded by a plurality of concentric rings whose reflective surfaces as formed by the mirrors approximate respective curvatures to focus light at a common focal point to set the focal length f1.

18. The reflective Fresnel Lens of claim 17, wherein the MFMS MMA is configured such that the center region and at least one of the concentric rings include a plurality of mirrors tipped, tilted and pistoned to approximate a continuous surface of the respective curvatures.

19. The reflective Fresnel Lens of claim 17, wherein the MEMS MMA is responsive to command signals to partition the MEMS MMA into a plurality of segments each comprising a plurality of mirrors, each segment responsive to command signals to form a different adjustable reflective Fresnel lens to collect and magnify a different beam of light.

20. The reflective Fresnel Lens of claim 17, wherein the MEMS MMA is responsive to additional command signals to piston the mirrors to superimpose an additional beam shaping onto the magnified beam.

* * * * *

UNITED STATES PATENT AND TRADEMARK OFFICE
CERTIFICATE OF CORRECTION

| | | |
|---|---|---|
| PATENT NO. | : 11,921,284 B2 | Page 1 of 2 |
| APPLICATION NO. | : 17/207177 | |
| DATED | : March 5, 2024 | |
| INVENTOR(S) | : Rogala et al. | |

It is certified that error appears in the above-identified patent and that said Letters Patent is hereby corrected as shown below:

On the Title Page

In item (71), in "Applicant", in Column 1, Line 1, delete "Waltham," and insert --Tewksbury,-- therefor In the Specification In Column 4, Line 45, delete "(DOI)" and insert --(DOF)-- therefor In Column 5, Line 23, delete "MIMA" and insert --MMA-- therefor In Column 5, Line 30, delete "MIMA" and insert --MMA-- therefor In Column 5, Line 34, delete "YY" and insert --XY-- therefor In Column 6, Line 5, delete "zings" and insert --rings-- therefor In Column 6, Line 9, delete "direction)," and insert --direction).-- therefor In Column 6, Line 35, delete "MFMS" and insert --MEMS-- therefor In Column 7, Line 26, delete "MFMS" and insert --MEMS-- therefor In Column 7, Line 29, delete "MFMS" and insert --MEMS-- therefor In the Claims In Column 7, Line 63, In Claim 1, delete "MFMS" and insert --MEMS-- therefor In Column 8, Line 22, in Claim 4, delete "(DOE)" and insert --(DOF)-- therefor Signed and Sealed this
Seventeenth Day of December, 2024

Derrick Brent
*Acting Director of the United States Patent and Trademark Office*

CERTIFICATE OF CORRECTION (continued)
U.S. Pat. No. 11,921,284 B2

In Column 8, Lines 25-26, in Claim 5, delete "MFMS MIMA" and insert --MEMS MMA-- therefor In Column 8, Line 45, in Claim 9, delete "MIMA" and insert --MMA-- therefor In Column 8, Line 54, in Claim 11, delete "MFMS" and insert --MEMS-- therefor In Column 10, Line 15, in Claim 18, delete "MFMS" and insert --MEMS-- therefor